(12) United States Patent
Weller et al.

(10) Patent No.: US 8,408,528 B2
(45) Date of Patent: Apr. 2, 2013

(54) CLAMPING DEVICE AND METHOD FOR CONNECTING A CLAMPING JAW TO A CLAMPING DEVICE

(75) Inventors: Hans-Michael Weller, Affalterbach (DE); Attilio Mandarello, Affalterbach (DE)

(73) Assignee: Hainbuch GmbH Spannende Technik (DE)

( * ) Notice: Subject to any disclaimer, the term of this patent is extended or adjusted under 35 U.S.C. 154(b) by 681 days.

(21) Appl. No.: 12/640,924

(22) Filed: Dec. 17, 2009

(65) Prior Publication Data
US 2010/0156016 A1    Jun. 24, 2010

(30) Foreign Application Priority Data
Dec. 18, 2008  (DE) .......... 10 2008 064 525

(51) Int. Cl.
*B25B 5/16* (2006.01)
*B25B 1/20* (2006.01)
*B25B 1/22* (2006.01)
*B25B 5/14* (2006.01)
*B25B 1/00* (2006.01)
*B25B 1/02* (2006.01)
*B25B 5/00* (2006.01)
*B23Q 3/00* (2006.01)
*B23Q 1/25* (2006.01)

(52) U.S. Cl. ............ 269/280; 269/327; 269/43; 269/45; 269/68; 269/71; 269/73; 269/105; 269/143; 269/152; 269/249; 369/309; 369/310

(58) Field of Classification Search ............ 269/32, 269/43, 45, 68, 71, 73, 105, 143, 152, 249, 269/280, 309, 310
See application file for complete search history.

(56) References Cited

U.S. PATENT DOCUMENTS

| 2,464,625 | A |   | 3/1949  | Warner                  |
|-----------|---|---|---------|-------------------------|
| 2,680,395 | A | * | 6/1954  | Christiansen ... 269/110 |
| 3,707,292 | A |   | 12/1972 | Morawski et al.         |
| 3,707,293 | A |   | 12/1972 | Morawski et al.         |
| 4,114,910 | A | * | 9/1978  | Reeder .......... 279/123 |
| 4,530,508 | A | * | 7/1985  | Ferraro ......... 279/123 |
| 5,149,071 | A | * | 9/1992  | Oliveira ........ 269/43  |
| 5,464,231 | A | * | 11/1995 | Clay ............ 279/123 |
| 6,012,712 | A |   | 1/2000  | Bernstein               |
| 2005/0218608 | A1 |   | 10/2005 | Taglang             |
| 2007/0063406 | A1 | * | 3/2007 | Soroka et al. .. 269/309 |
| 2009/0051092 | A1 | * | 2/2009 | Egger .......... 269/138  |

FOREIGN PATENT DOCUMENTS

| DE | 889880 C       | 9/1953 |
| DE | 1121430 B      | 1/1962 |
| DE | 102004001839 A1 | 8/2005 |
| DE | 602004006600 T2 | 1/2008 |
| EP | 1704010 A1     | 9/2006 |

* cited by examiner

*Primary Examiner* — Monica Carter
*Assistant Examiner* — Nirvana Deonauth
(74) *Attorney, Agent, or Firm* — Akerman Senterfitt

(57) ABSTRACT

A clamping device has several clamping element receptacles each with a clamping element held by the clamping element receptacle. The clamping element receptacles have an inclination running obliquely to a clamping direction of the clamping device and by means of which the clamping element is guided. The clamping element has a clamping jaw support and the clamping jaw is connectable to the clamping jaw support. The clamping jaw engages in an undercut provided on the clamping jaw support and is additionally fixed by means of a positive fixing means to the clamping jaw support when it is connected to the clamping jaw support.

23 Claims, 5 Drawing Sheets

CLAMPING DEVICE AND METHOD FOR CONNECTING A CLAMPING JAW TO A CLAMPING DEVICE

SCOPE OF APPLICATION AND PRIOR ART

The invention relates to a clamping device and to a method for connecting a clamping jaw to a clamping jaw support of a clamping device of this type.

A clamping device of this type is known for example from EP 1704010 A1. It has four clamping head segments that are held by receptacle parts. To that end, the clamping head segments are arranged in an area surrounded by the receptacle parts. The receptacle parts are arranged in a circle around a recess and each have a wedge-shaped section in contact with the clamping head segments and by means of which the clamping head segments are transferred by a clamping movement into a clamping position.

PROBLEM AND SOLUTION

The object underlying the invention is to provide a clamping device and a stated method with which the adaptability of the clamping of a clamping device can be adjusted more easily than in the prior art to different external contours of objects to be clamped.

This problem is solved by a clamping device and by a method as described herein. Advantageous and preferred embodiments of the invention form the subject matter of further claims and are explained in greater detail hereinafter. The wording of the claims is made into part of the content of the description by express reference. Some of the following but not exhaustively listed features and properties apply for both the clamping device and the method. They are in some cases only described once, but apply independently of one another and in any combination both for the clamping device and for the method. Furthermore, the sequence of the listed features is not binding, but can be altered to correspond to an optimized clamping device or to an optimized method.

In accordance with the invention, a clamping device has several clamping means receptacles each with at least one clamping element held by the clamping means receptacle, where each clamping means receptacle has at least one inclination running obliquely to a clamping direction of the clamping device and by means of which the at least one clamping element is at least partially guided. The clamping element has a clamping jaw support and a clamping jaw connectable to the clamping jaw support, where the clamping jaw engages in an undercut provided on the clamping jaw support when in the state connected to the clamping jaw support and is additionally fixed by means of a non-positive and/or positive fixing means to the clamping jaw support. The embodiment in accordance with the invention and according to Claim 1 advantageously results in a simple and flexible adaptability of the clamping device to the objects that are to be clamped and that can have widely differing external contours. This adaptability is achieved by providing the fastening of the clamping jaws on the clamping jaw support in a simple manner, i.e. by inserting a section of the clamping jaw into the undercut part of the clamping jaw support and then fixing the clamping jaw in this position. The provision of the undercut connection makes it possible to provide only a single fixing element for fixing the clamping jaw to the clamping jaw support.

The clamping means receptacles can be of differing design for receiving the clamping elements, where of the respective clamping elements in particular the clamping jaw holder is received by the clamping means receptacle. It is particularly preferred that the clamping means receptacle is a recess of which the contour has been selected such that a clamping jaw holder can be received there with a so-called sliding seat fit. It is however important here whether the clamping means receptacle extends far enough for the clamping jaw support to be arranged inside it over its entire longitudinal extent or not.

The clamping direction of the clamping device runs in accordance with the invention substantially parallel to a central longitudinal axis of the clamping device. For a clamping operation, some parts of the clamping device, at least however the clamping elements, are moved in the clamping direction. Thanks to the oblique configuration of the clamping means receptacle, the clamping elements move, depending on the angle of the oblique surface, towards or away from one another during movement of the clamping elements in the clamping direction or against the clamping direction respectively. This movement of the clamping elements towards one another is used for clamping those components that are to be clamped by their external contour. Accordingly, the movement of the clamping elements away from one another is used for releasing the clamping effect or if necessary for clamping a component to be clamped by its internal contour.

The clamping jaws can be designed in accordance with the invention substantially in any manner desired. It is thus possible to provide, for example, one or more substantially point-type elevations on the respective clamping jaw that are positioned thereon such that the elevations move towards the workpiece to be clamped when the clamping effect is generated. Further possibilities for designing the clamping jaws include for example appropriate point-type and/or linear recesses, notches or the like.

In an embodiment of the invention, the undercuts of the clamping jaw supports each absorb clamping forces acting substantially parallel to the fixing means of the clamping jaws to the clamping jaw support. In particular, the vector of these clamping forces runs vertical to the clamping direction on a central plane of the clamping element. The clamping force applied is thus transmitted better into the clamping jaw support than with only one fixing means or with only one contact point.

In a further embodiment of the invention, the clamping jaws are designed substantially hook-like at least in some sections. In particular, this hook-like design of the clamping jaws is provided in that part of the clamping jaws in which they engage in the undercuts of the clamping jaw support.

In an embodiment of the invention, the clamping device is connectable using an adapter that has for that purpose parts of a bayonet mount on the adapter side. An adapter of this type can for example be connected to a machine bed or the like, for example in a milling machine or the like. In this way, it is advantageously achieved that the adapter can remain permanently in the respective machine and only the clamping device has be adapted to the respective workpiece to be clamped. Besides the clamping device in accordance with the invention, the adapter can also be designed connectable to other devices for workpiece clamping, for example with so-called mandrels or the like for chucking. A bayonet mount is understood here to be a possibility for connection where at least two components to be connected are pushed at least partly into one another by means of a linear movement and then turned a certain number of degrees relative to one another by means of a rotation movement. Thanks to this rotation, sections of the at least two components engage in undercuts on the other component. A bayonet mount can be additionally secured in accordance with the invention by means of screw unions or the like, however also pretensioned, for example by means of spring action or the like. Overall, it is of course possible to connect the clamping device to the adapter using other fixing means and for example to use the bayonet mount for generating of a clamping effect, for example.

In an embodiment of the invention, the clamping device has a coupling device having at least a first coupling part and a second coupling part, where the coupling parts transmit a clamping force independently of one another and into different clamping jaw supports. The coupling parts are to that end in engagement with the clamping elements, for example by projections of the coupling parts projecting into recesses of the clamping elements, in particular of the clamping jaw support. Due to the fact that the coupling parts can transmit a clamping force independently of one another and into different clamping jaw supports, these clamping jaw supports and hence also the clamping jaws can be moved independently of at least one other clamping jaw or clamping jaw support. In this way, a workpiece, for example with an irregular external contour in the part to be clamped, can be clamped initially by, for example, two clamping elements, for example for primary fixing, or guided between two clamping jaws and clamped between the other two clamping jaws.

In an embodiment of the invention, the first and the second coupling parts can be coupled to one another and the coupling has parts of a bayonet mount on the clamping device side. In a further embodiment of the invention, the coupling parts are each connectable to a section of the bayonet mount on the adapter side which is independent of those sections of the bayonet mount provided for other coupling parts. These independent and separable sections of the bayonet mount can for example be provided in the form of circular segments supplementing one another to form a circle. An alternative arrangement of these sections can consist of arranging coaxially relative to each other two bayonet mounts independent of one another and complete in each case, i.e. a small inside bayonet mount and a larger outside bayonet mount. In this case, the outer bayonet mount at least partially surrounds the inner bayonet mount.

In an embodiment of the invention, the coupling parts transmit a movement of the bayonet mount sections in or against the clamping direction to the clamping jaw supports. The movement in the clamping direction or against the clamping direction generates, as already mentioned above, the clamping effect of the clamping elements substantially in that the clamping elements are guided along the slanted plane.

In an embodiment of the invention, an even number of clamping means receptacles are provided, preferably four. In this way, polygonal and in particular non-rotation-symmetrical components can be securely clamped.

In an embodiment of the invention, the clamping jaw supports can be moved or driven are optionally in pairs or in total to generate a clamping effect. It is also possible to jointly drive, for example, groups of three, four or even more clamping elements. Depending on what form the object to be clamped has, this object to be clamped is in this way first for example centered near the clamping device and after that finally clamped. It is also conceivable that three clamping elements, arranged at an angle of 120° to one another, are movable simultaneously. In addition to this clamping by means of three clamping elements, three further clamping elements can then be added for an additional clamping effect.

In total, clamping elements can be driven simultaneously or consecutively to generate a clamping effect. The clamping elements can for that purpose be connectable to one another or movable completely independently of one another. The number of clamping elements to be provided can be varied depending on the size of the object to be clamped. As already mentioned above, it is possible for example that three clamping elements are sufficient. Depending on the size, in particular depending on the mass or circumference, of the object to be clamped or on the forces that are expected to occur during machining, further clamping elements may be necessary and advisable.

In a further embodiment of the invention, the clamping device has a basic element that is designed for the substantially immovable holding of counter-pieces to the clamping jaws on an end face facing a workpiece to be clamped. These counter-pieces can for example be inner brackets and/or plates or the like. These counter-pieces can then, similarly to the clamping jaws, have substantially point-type elevations, grooves, notches or the like. The counter-pieces can for example also each have an internal contour which when combined corresponds to an external contour of a workpiece to be clamped. This embodiment is advantageous when comparatively high-volume and/or heavy components are to be clamped, that for example have to be clamped in a guaranteed and reproducible position.

In a further embodiment of the invention, the basic element has a central recess at least for receiving the coupling parts, where the recess is closable by means of a cover piece. The central recess permits access to components and also their positioning inside the clamping device. The cover piece acts in particular as a protection from soiling of the components inside the clamping device. Furthermore, this cover piece can have a certain height in order for example to support a component to be clamped in a central part when it is held by the clamping jaws. Moreover, it is of course also conceivable that the recess can be prepared or provided for receiving further clamping elements, for example clamping bushes or the like.

In a further embodiment of the invention, the clamping jaw is substantially arc-shaped, where a hook-like section is provided at an end hook-part of the arc for engaging in the undercut of the clamping jaw support. The hook-like section extends into the arc, preferably in a direction opposite to the course of the arc.

The problem underlying the invention is also solved by a method for connecting a clamping jaw to a clamping jaw support of a clamping device in accordance with the above description in which those parts of the clamping jaw and of the clamping jaw support forming the undercut connection are hooked inside one another. The clamping jaw is here swivelled towards the clamping jaw support, where swivelling takes place about an axis arranged in the part of the undercut connection and where the clamping jaw is fixed on the clamping jaw support by means of a non-positive and/or positive fixing means.

These and further features can be gathered from the claims, description and drawings, and the individual features, both singly and in the form of subcombinations, can be implemented in an embodiment of the invention and in other fields and can represent advantageous, independently protectable constructions for which protection is claimed here. The subdivision of the application into individual sections and the subheadings in no way restricts the general validity of the statements made thereunder.

BRIEF DESCRIPTION OF THE DRAWINGS

Various embodiments of the invention are illustrated schematically in the drawings and explained in greater detail in the following. The embodiments shown in the individual figures have in some cases features that the other embodiments of the invention shown do not have or are not described explicitly in their context. The features can however, without leaving the scope of the invention, be combined with one another in any way. The drawings show in.

DETAILED DESCRIPTION OF THE DRAWINGS

Figure 1:
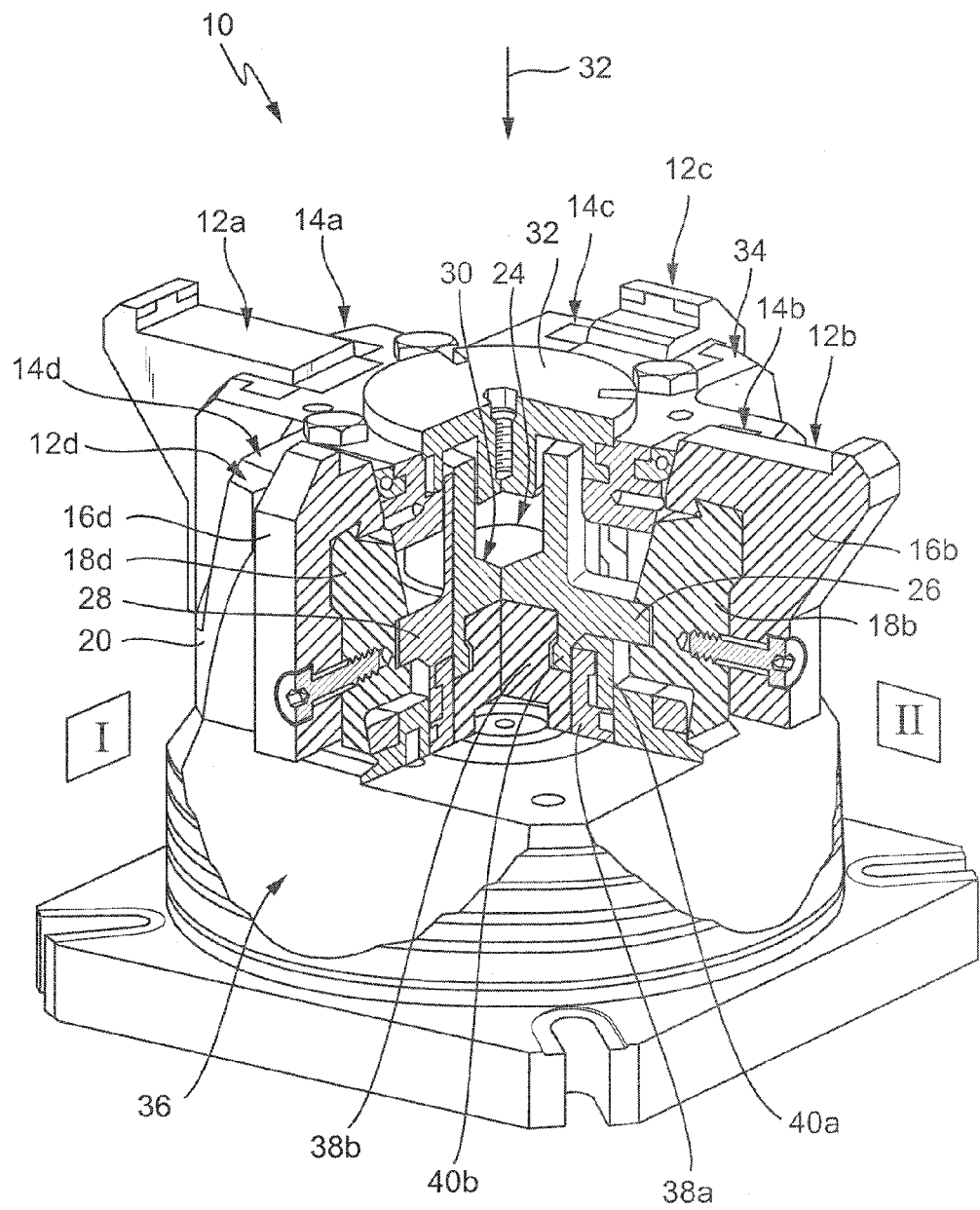
FIG. 1 an isometric partially cutaway view of a first embodiment of the clamping device in accordance with the invention mounted on an adapter, FIG. 2 a cutaway side view of the clamping device in accordance with the invention according to Plane II from FIG. 1, partly in an exploded view, FIG. 3 a cutaway side view of the clamping device in accordance with the invention according to Plane II in FIG. 1, in an assembled state, FIG. 4a a cutaway side view of the clamping device in accordance with the invention according to Plane II in FIG. 1, FIG. 4b a cutaway side view of the clamping device in accordance with the invention according to Plane I in FIG. 1, FIG. 5 an isometric view of the clamping device in accordance with the invention according to a second embodiment, mounted on an adapter, FIG. 6 an isometric view of the clamping device in accordance with the invention according to a third embodiment, mounted on an adapter, FIG. 7 an isometric view of the clamping device in accordance with the invention according to a fourth embodiment, mounted on an adapter, and FIG. 8 an isometric view of the clamping device in accordance with the invention according to a fifth embodiment, mounted on an adapter.

FIG. 1 shows a clamping device 10 with four clamping elements 12a-d held in associated clamping element receptacles 14a-d. The clamping elements 12 comprise among other things a clamping jaw 16 and a clamping jaw support 18 connected to one another, this connection being dealt with in detail in the following.

The clamping element receptacles 14 are provided in a basic element 20 of the clamping device 10. The clamping element receptacles 14 are so designed that the clamping elements 12 are movable in and against a clamping direction 22. The basic element 20 has a central recess 24 in which among other things a first coupling part 26 and a second coupling part 28 are arranged to form a coupling 30. The central recess 24 is closed in accordance with FIG. 1 by means of a cover piece 32 provided on an end face 34 of the basic element 10.

The clamping device 10 is mounted on an adapter 36. The adapter 36 has bayonet mount sections 38a and 38b on the adapter side which engage with the first coupling part 26 or the second coupling part 28. To that end, the coupling parts 26, 28 have bayonet mount parts 40a and 40b on the clamping device side.

Figure 2:
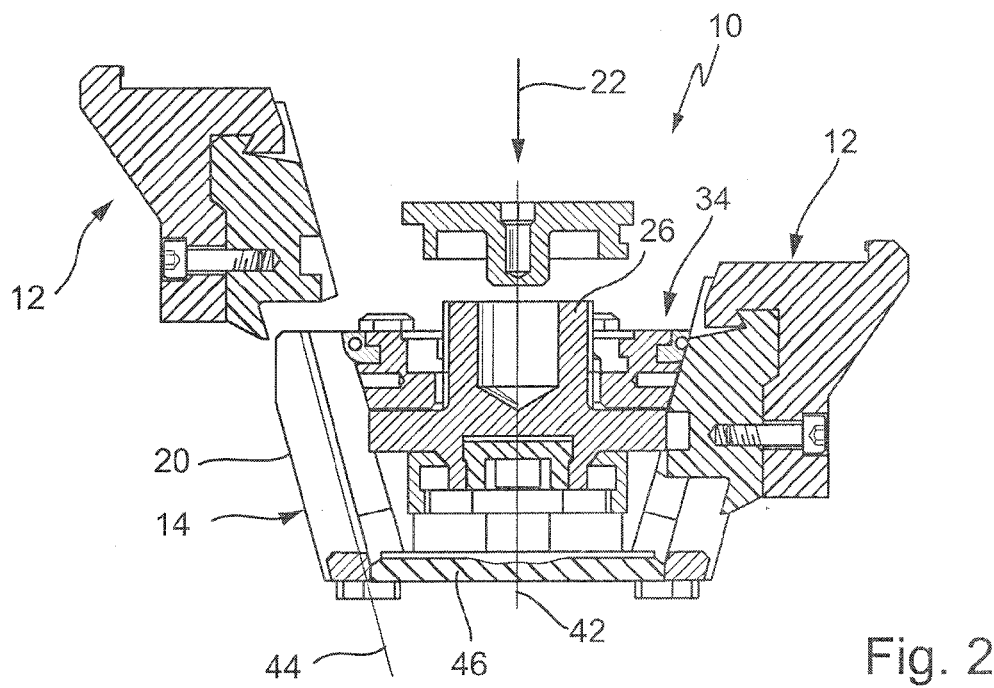

In the cutaway side view of the clamping device 10 shown partly exploded according to Plane II of FIG. 1, it can be seen how the clamping element receptacles 14 for receiving the clamping elements 12 are designed and how the clamping elements 12 engage with the associated first coupling part 26. The clamping element receptacle 14 runs obliquely to the clamping direction 22, where the clamping direction 22 runs parallel to a central longitudinal axis 42 of the clamping device 10. The oblique shape of the clamping element receptacles 14 is selected here such that central axes 44 of the clamping element receptacles intersect on a side 46 facing away from the end face 34 of the basic element 20. This ensures that the clamping elements 12, if they are moved in the clamping direction 22 by means of the first coupling part 26, move towards one another, thereby permitting a clamping effect to be achieved on an object to be clamped, not shown in FIG. 2.

In the cutaway side view of the clamping device 10 according to Plane II in FIG. 1, it can be seen how a clamping jaw 16 can be brought into engagement with a clamping jaw support 18 in order to form the clamping element 12. For that purpose, the clamping jaw 16 has a substantially arc-shaped structure, where the clamping jaw 16 has a hook-like section 48 in a hook-part facing the end face 34 of the basic element 20. The hook-like section is, as shown in the left-hand half of FIG. 3, tilted relative to its end position and brought into engagement with a hook-like section 50 of the clamping jaw support 18, so that an undercut connection 52 is obtained.

Figure 3:
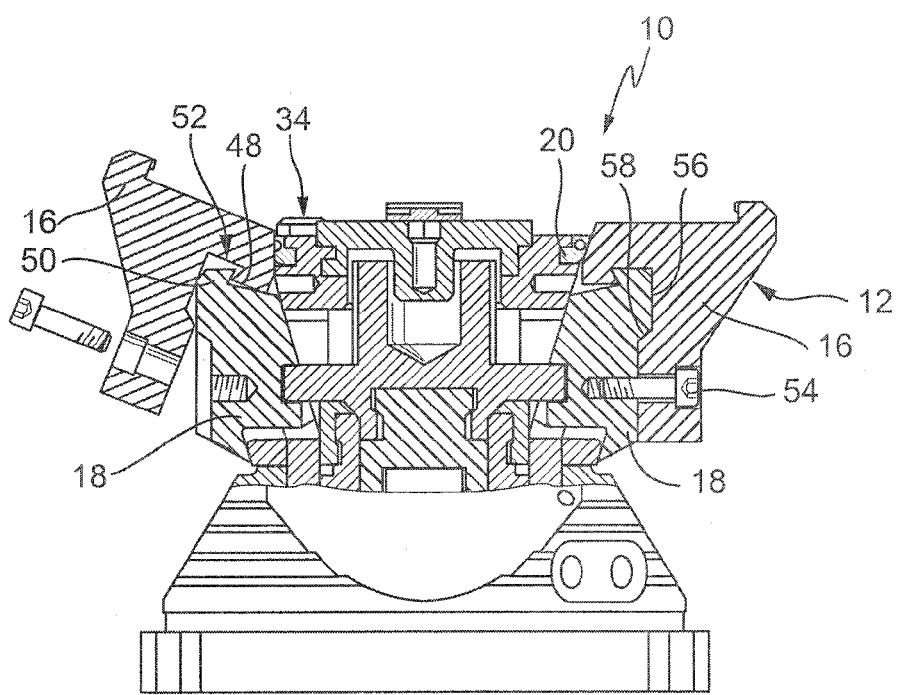

Then the clamping jaw 16 is swivelled about an axis arranged in the part of the undercut connection 52, so that the clamping jaw 16 is transferred to the position shown in the right-hand part of FIG. 3. In the position shown in the right-hand part of FIG. 3, the clamping jaw 16 is fixed by means of a fixing means 54, in this case a screw union, to the clamping jaw support 18. FIG. 3 also shows that at least one section of an internal contour 56 of the clamping jaw 16 is so designed that it is in contact with at least one section of an external contour 58 of the clamping jaw support 18.

Figure 4A:
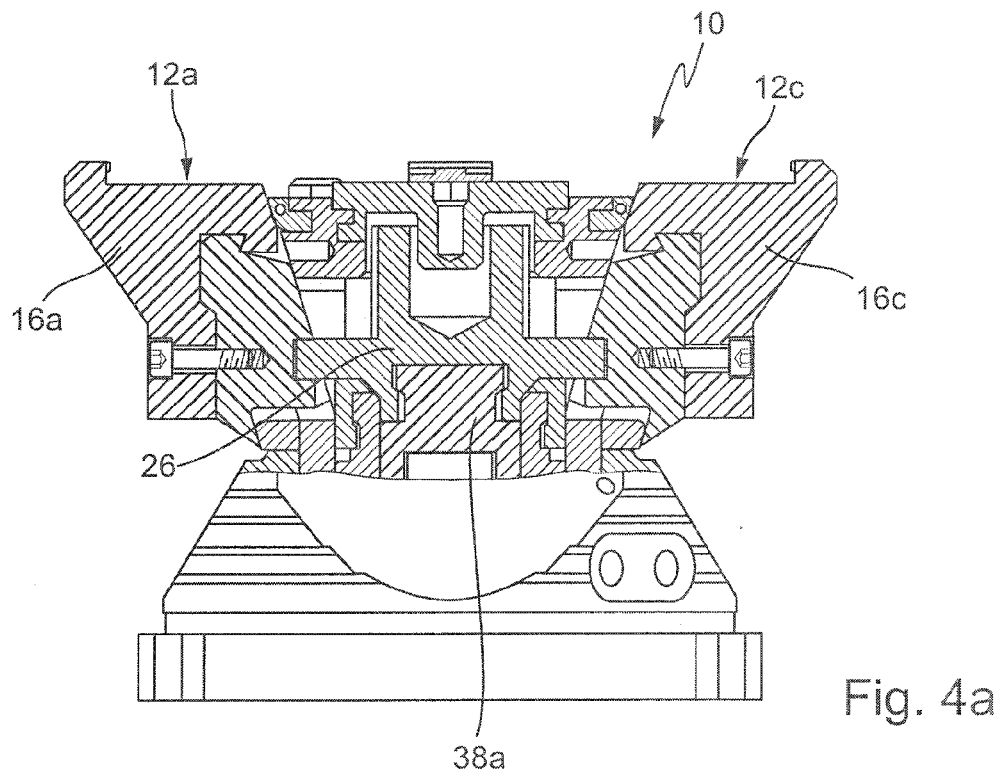
Figure 4B:
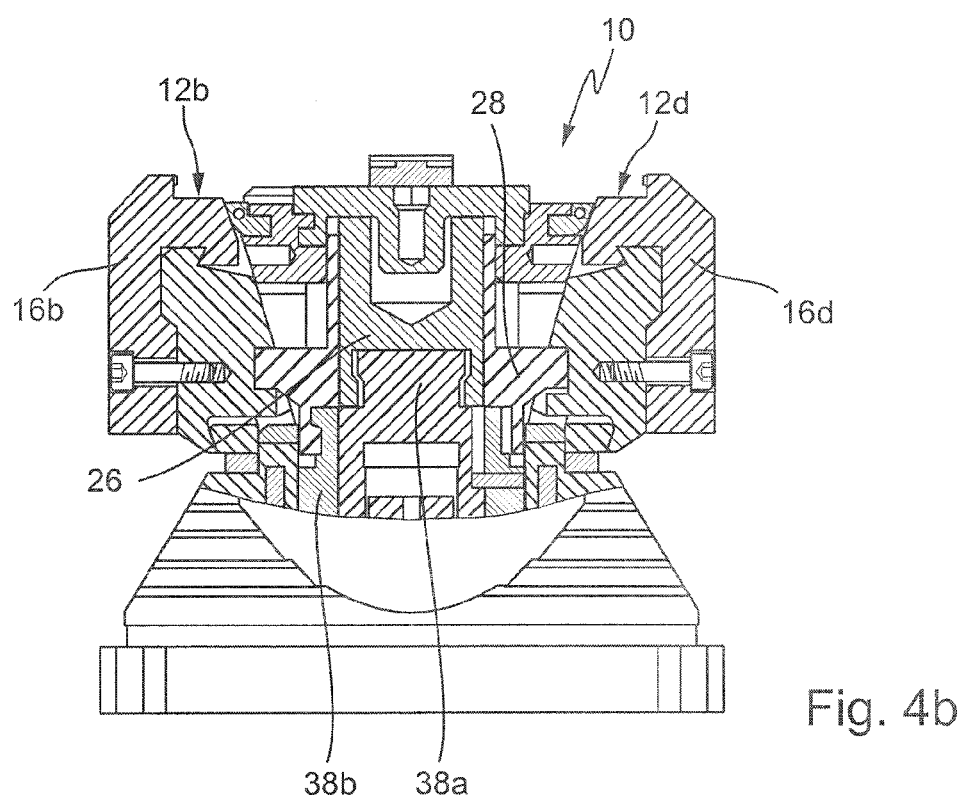

FIGS. 4a and 4b each show side views of the clamping device 10 in accordance with the invention, where FIG. 4a is shown in a section according to Plane II in FIG. 1 and FIG. 4b in a section according to Plane I in FIG. 1. It can be seen that the clamping jaws 12a and 12b in FIG. 4a are designed differently from the clamping jaws 12c and 12d in FIG. 4b. In the selected configuration in accordance with FIG. 4, a workpiece to be clamped and having clamping parts aligned substantially in block form relative to one another can for example be clamped. In particular, FIGS. 4a and 4b show that the clamping elements 12a and 12c are connected by means of the first coupling part 26 and the clamping elements 12b and 12d in FIG. 4b by means of the second coupling part 28. The first coupling part 26 and the second coupling part 28 are here arranged coaxially to one another. It can also be seen from FIGS. 4a and 4b that the first coupling part 26 is connected to a first bayonet mount section 38a on the adapter side and that the second coupling part 28 is connected to a second bayonet mount section 38b on the adapter side. In this case, the bayonet mount section parts 38 on the adapter side are usable/operable independently of one another.

Thanks to this paired connection of the clamping elements 12 by means of the corresponding coupling parts 26, 28 and the connection of the coupling parts 26, 28 in each case with a bayonet mount section 38 on the adapter side, the clamping elements 12 can each be moved in pairs and successively for generating a clamping effect, or for example to release the clamping effect. The bayonet mount section parts 38 on the adapter side can of course also be coupled to one another, so that all clamping elements 12 can be moved simultaneously.

Figure 5:
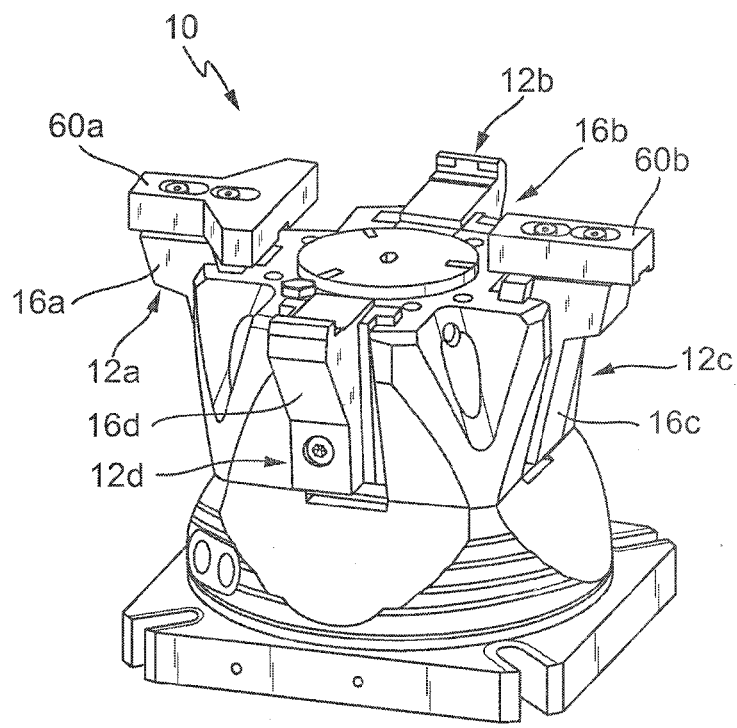

In FIG. 5, the clamping device 10 is provided with clamping elements 12 that have differently designed clamping jaws 16a-d, where the clamping jaws 16b and 16d substantially correspond to the clamping jaws 16 described above. Only the clamping jaws 16a and 16c are provided with additional clamping parts, which here are aligning parts 60a and 60b and between which a workpiece to be clamped, not shown in FIG. 5, can be aligned.

Figure 6:
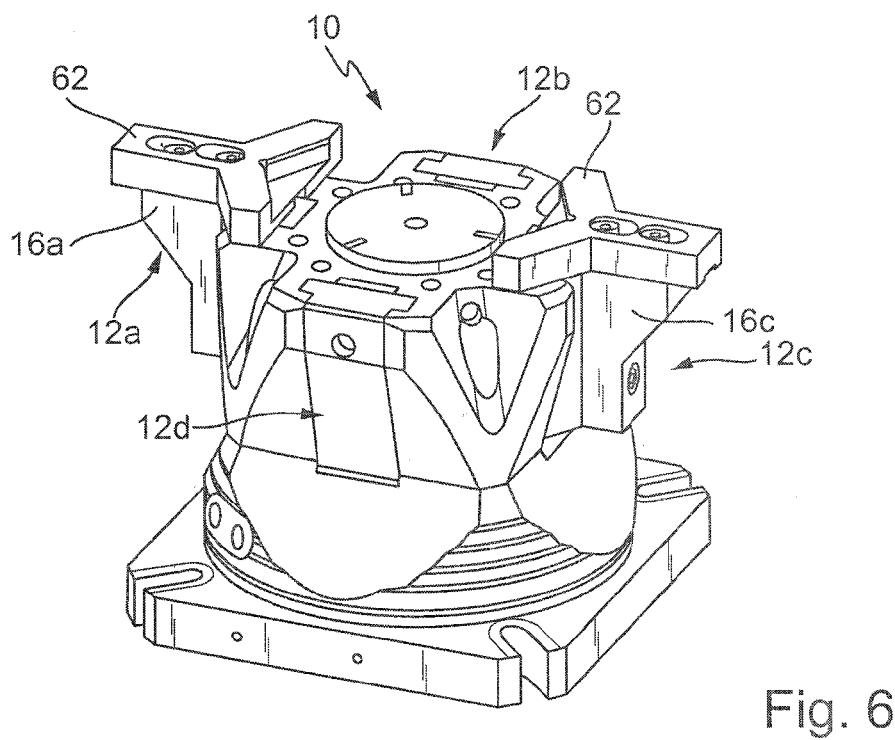

An alternative possibility for the design of clamping elements 12 of the clamping device 10 in accordance with the invention is shown in FIG. 6. The clamping elements 12b and 12d here do not have clamping jaws, with only the clamping elements 12*a* and 12*c* being provided with clamping jaws 16*a* and 16*c*. The latter have clamping parts 62 substantially of V-shaped design.

Figure 7:
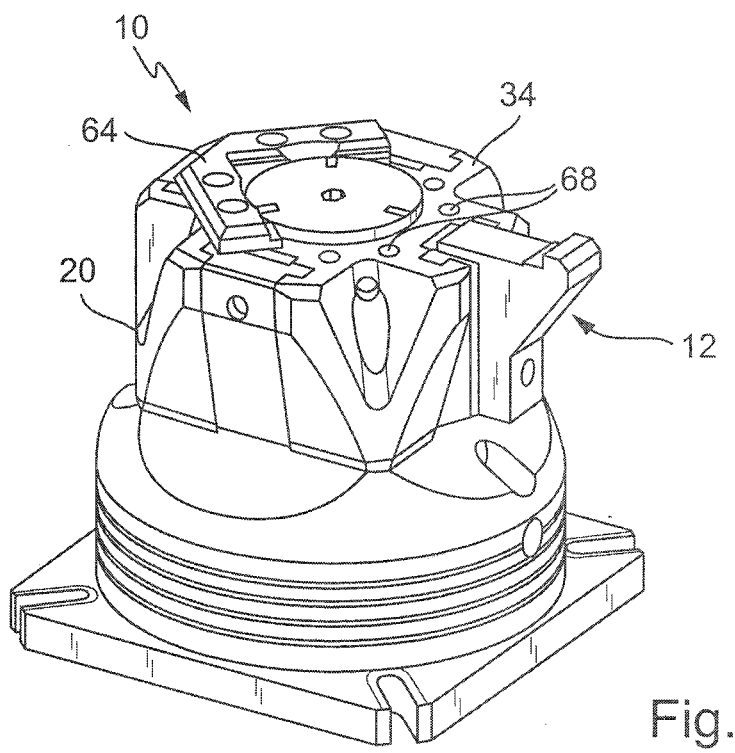
Figure 8:
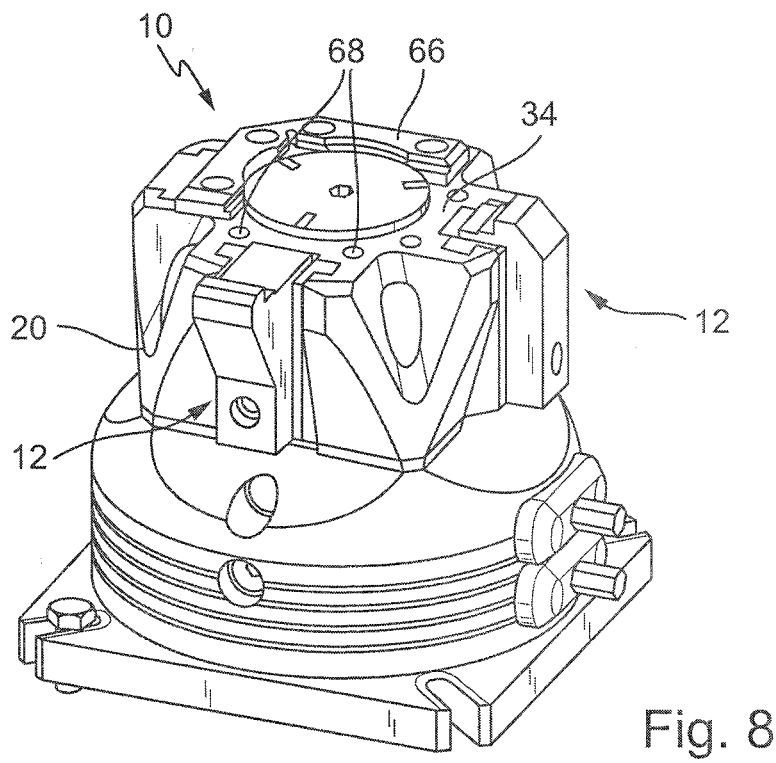

FIG. 7 and FIG. 8 each show a further embodiment of the clamping device 10 in accordance with the invention. Unlike in the previously described embodiments, a clamping plate 64 and 66 is provided here in each case and fastened to the end face 34 of the basic element 20 of the clamping device 10. The basic element 20 is provided for that purpose with recesses 68 each having a female thread, not shown. The clamping plates 64 and 66 can be of differing design, for example elongated, not shown here, or angular. Depending on the arrangement of the clamping plates 64 and 66, a differing number of clamping elements 12 must be provided for a clamping operation.

The invention claimed is:

1. A clamping device, comprising: a plurality of clamping element receptacles; at least one clamping element having a clamping jaw support and a clamping jaw connectable to said clamping jaw support, the clamping element held by each clamping element receptacle, wherein said clamping element receptacles have at least one inclination running obliquely to a clamping direction of said clamping device and by means of which said at least one clamping element is at least partially guided, a coupling having a first coupling part and a second coupling part that transmit a clamping force independently of one another and into a different clamping law support of a plurality of clamping jaw supports, and wherein said clamping jaw is connected to said clamping jaw support by engaging in an undercut provided on said clamping jaw support and is additionally fixed by a fixing means to said clamping jaw support wherein said clamping device is configured to connect to an adapter having an adapter side including bayonet mount parts, wherein said first coupling part and a second coupling part are coupleable to one another and wherein said coupling has bayonet mount parts for coupling to the bayonet mount parts of the adapter.

2. The clamping device according to claim 1, wherein said undercut of said clamping jaw support each absorbs clamping forces acting substantially parallel to said fixing means.

3. The clamping device according to claim 1, wherein said clamping jaws are designed substantially hook-like.

4. The clamping device according to claim 1, wherein said coupling parts are each connectable to the bayonet mount parts on said adapter side, wherein each bayonet mount part is independent of other bayonet mount parts provided for other coupling parts.

5. A clamping device, comprising: a plurality of clamping element receptacles; at least one clamping element having a clamping jaw support and a clamping jaw connectable to said clamping jaw support, the clamping element held by each clamping element receptacle, wherein said clamping element receptacles have at least one inclination running obliquely to a clamping direction of said clamping device and by means of which said at least one clamping element is at least partially guided; a coupling having coupling parts, each coupling part having a bayonet mount part, wherein said clamping jaw is connected to said clamping jaw support by engaging an undercut provided on said clamping jaw support and is fixed to said clamping jaw support by a fixing means, wherein said clamping jaws are designed substantially hook-like, and wherein said clamping device is configured to connect to an adapter having bayonet mount sections, wherein said coupling parts are designed such that they transmit a movement of said bayonet mount sections along said clamping direction to said clamping jaw support.

6. The clamping device according to claim 1, wherein an even number of said clamping element receptacles are provided.

7. The clamping device according to claim 6, wherein a plurality of clamping jaw supports can be driven in pairs to generate a clamping effect.

8. The clamping device according to claim 6, wherein a plurality of clamping jaw supports can be driven in total to generate a clamping effect.

9. The clamping device according to claim 1, wherein said clamping device has a basic element that is designed for the substantially immovable holding of counter-pieces to said clamping jaws on a front end facing a workpiece to be clamped.

10. The clamping device according to claim 9, wherein said basic element has a central recess for receiving said coupling parts, wherein said recess is closable by means of a cover piece.

11. The clamping device according to claim 1, wherein said clamping jaw is substantially arc-shaped, wherein a hook-like section is provided at an end of said arc-shaped jaw for engaging in said undercut of said clamping jaw support, wherein said hook-like section extends in a hook-part enclosed by said arc-shaped jaw.

12. The clamping device according to claim 11, wherein said hook-like section extends in a direction opposite to a course of said arc-shaped jaw.

13. The clamping device according to claim 5, wherein said undercut of said clamping jaw support absorbs clamping forces acting substantially parallel to said fixing means.

14. The clamping device according to claim 5, wherein said coupling parts are each connectable to the bayonet mount parts on said adapter side, wherein each bayonet mount part is independent of other bayonet mount parts provided for other coupling parts.

15. The clamping device according to claim 5, wherein an even number of said clamping element receptacles are provided.

16. The clamping device according to claim 15, wherein a plurality of clamping jaw supports can be driven in pairs to generate a clamping effect.

17. The clamping device according to claim 15, wherein a plurality of clamping jaw supports can be driven in total to generate a clamping effect.

18. The clamping device according to claim 5, wherein said clamping device has a basic element that is designed for the substantially immovable holding of counter-pieces to said clamping jaws on a front end facing a workpiece to be clamped.

19. The clamping device according to claim 18, wherein said basic element has a central recess for receiving said coupling parts, wherein said recess is closable by means of a cover piece.

20. The clamping device according to claim 5, wherein said clamping jaw is substantially arc-shaped, wherein a hook-like section is provided at an end of said arc-shaped jaw for engaging in said undercut of said clamping jaw support, wherein said hook-like section extends in a hook-part enclosed by said arc-shaped jaw.

21. The clamping device according to claim 20, wherein said hook-like section extends in a direction opposite to a course of said arc-shaped jaw.

22. The clamping device according to claim 1, wherein each coupling part is connectable to a different bayonet mount section that is independent of other bayonet mount sections provided for other coupling parts.

23. The clamping device according to claim 1, wherein at least one of the first coupling part and the second coupling part is designed such that it transmits a movement of the bayonet mount sections along the clamping direction to the clamping jaw support.

\* \* \* \* \*